United States Patent
Nitzan et al.

(10) Patent No.: US 8,162,230 B2
(45) Date of Patent: Apr. 24, 2012

(54) METHOD AND CIRCUIT FOR PROVIDING RF ISOLATION OF A POWER SOURCE FROM AN ANTENNA AND AN RFID DEVICE EMPLOYING SUCH A CIRCUIT

(75) Inventors: Zvi Nitzan, Zofit (IL); Doron Lavee, Carmei Yosef (IL); Benyamin Almog, Beit Arie (IL)

(73) Assignee: PowerID Ltd., Petach-Tikva (IL)

( * ) Notice: Subject to any disclaimer, the term of this patent is extended or adjusted under 35 U.S.C. 154(b) by 0 days.

(21) Appl. No.: 12/424,749

(22) Filed: Apr. 16, 2009

(65) Prior Publication Data

US 2009/0308936 A1    Dec. 17, 2009

Related U.S. Application Data

(63) Continuation-in-part of application No. PCT/IL2007/001235, filed on Oct. 16, 2007, and a continuation-in-part of application No. 11/872,928, filed on Oct. 16, 2007, now abandoned.

(60) Provisional application No. 60/829,780, filed on Oct. 17, 2006.

(51) Int. Cl.
*G06K 19/06* (2006.01)
(52) U.S. Cl. ........................................ 235/492; 235/487
(58) Field of Classification Search .................. 235/487, 235/492
See application file for complete search history.

(56) References Cited

U.S. PATENT DOCUMENTS

| | | | |
|---|---|---|---|
| 4,703,327 A | 10/1987 | Rossetti et al. | |
| 5,109,203 A * | 4/1992 | Zucker et al. ................. | 331/96 |
| 5,289,142 A | 2/1994 | Upton | |
| 5,778,306 A | 7/1998 | Kommrusch | |
| 5,909,641 A | 6/1999 | Simmons | |
| 6,097,347 A | 8/2000 | Duan et al. | |
| 6,100,840 A * | 8/2000 | Zidek et al. ..................... | 342/42 |
| 6,459,415 B1 | 10/2002 | Pachal et al. | |
| 6,967,574 B1 * | 11/2005 | Nelson ........................... | 340/551 |
| 7,323,994 B2 | 1/2008 | Yamagajo et al. | |
| 7,786,872 B2 * | 8/2010 | Smith et al. ................. | 340/572.7 |
| 2004/0000966 A1 * | 1/2004 | Killen et al. .................. | 333/117 |
| 2004/0004119 A1 | 1/2004 | Baldassari et al. | |
| 2004/0042391 A1 * | 3/2004 | Murata et al. ................. | 370/210 |
| 2004/0178912 A1 | 9/2004 | Smith et al. | |
| 2005/0092845 A1 | 5/2005 | Forster | |
| 2005/0173532 A1 * | 8/2005 | Hasebe et al. ................ | 235/451 |

(Continued)

FOREIGN PATENT DOCUMENTS

EP    1450240    8/2004

(Continued)

OTHER PUBLICATIONS

International Search Report and the Written Opinon Dated Feb. 29, 2008 From the International Searching Authority Re.: Application No. PCT/IL2007/001235.

(Continued)

*Primary Examiner* — Michael G Lee
*Assistant Examiner* — Matthew Mikels

(57) ABSTRACT

An RFID device including:
- electronic circuitry suitable for an RFID device comprising a radio frequency section;
- an antenna;
- a battery which provides the device with power; and
- at least one quarter wavelength transmission line coupled between the battery and one or both of the electronic circuitry and the antenna.

26 Claims, 8 Drawing Sheets

U.S. PATENT DOCUMENTS

| | | | |
|---|---|---|---|
| 2005/0275591 | A1 | 12/2005 | King et al. |
| 2006/0192002 | A1* | 8/2006 | Forster .................. 235/385 |
| 2006/0208900 | A1 | 9/2006 | Tavassoli Hozouri |
| 2007/0222681 | A1* | 9/2007 | Greene et al. .......... 343/700 MS |
| 2007/0296548 | A1* | 12/2007 | Hall et al. ............... 340/10.1 |
| 2008/0174380 | A1 | 7/2008 | Nitzan et al. |
| 2008/0186245 | A1 | 8/2008 | Hilgers |

FOREIGN PATENT DOCUMENTS

| | | |
|---|---|---|
| EP | 1814190 | 8/2007 |
| GB | 2326799 | 12/1998 |
| WO | WO 00/64004 | 10/2000 |
| WO | WO 2006/031580 | 3/2006 |
| WO | WO 2008/047352 | 4/2008 |

OTHER PUBLICATIONS

Response Dated May 26, 2010 to Official Action of Mar. 2, 2010 From the US Patent and Trademark Office Re.: U.S. Appl. No. 11/872,928.

International Search Report Dated Feb. 29, 2008 From the International Searching Authority Re.: Application No. PCT/IL2007/001235.

Official Action Dated Mar. 2, 2010 From the US Patent and Trademark Office Re.: U.S. Appl. No. 11/872,928.

Written Opinion Dated Feb. 29, 2008 From the Intenational Searching Authority Re.: Application No. PCT/IL2007/001235.

Chen et al. "Performance of a Folded Dipole With a Closed Loop for RFID Applications", PIERS Proceedings, Progress in Electromagnetics Research Symposium 2007, Prague, Czech Republic, p. 329-331, Aug. 27-30, 2007.

Griffin et al. "Radio Link Budgets for 915 MhZ RFID Antennas Placed on Various Objects", Texas Wireless Symposium 2005, p. 22-26, 2005.

Prothro et al. "The Effect of a Metal Ground Plane on RFID Anntennas", IEEE Antennas and Propagation Society International Symposium 2006, p. 3241-3244, 2006.

Qing et al. "A Folded Antenna for RFID", IEEE Antennas and Propagation Society International Symposium 2004, p. 97-100, 2004.

Rao et al. "Antenna Design for UHF RFID Tags: A Review and a Practical Application", IEEE Transactions on Antennas and Propagation, 53(12): 3870-3876, Dec. 2005. Comments and Replies, 54(6): 1906-1907, Jun. 2006.

Swatch Group "1 Kbit Read/Write, ISO 18000-6C / EPC C-1 G-2 Passive / Battery Assisted Contactless IC", EM Microelelctronic—Marin SA EM 4324, 2008.

Official Action Dated Aug. 16, 2010 From the US Patent and Trademark Office Re.: U.S. Appl. No. 11/872,928.

* cited by examiner

US 8,162,230 B2

METHOD AND CIRCUIT FOR PROVIDING RF ISOLATION OF A POWER SOURCE FROM AN ANTENNA AND AN RFID DEVICE EMPLOYING SUCH A CIRCUIT

RELATED APPLICATIONS

This application is a continuation-in-part of PCT Patent Application No. PCT/IL2007/001235 filed on Oct. 16, 2007, which claims the benefit of priority of U.S. Provisional Patent Application No. 60/829,780 filed on Oct. 17, 2006.

This application is also a continuation-in-part of U.S. patent application Ser. No. 11/872,928 filed on Oct. 16, 2007, which claims the benefit of priority of U.S. Provisional Patent Application No. 60/829,780 filed on Oct. 17, 2006.

The disclosures of the above applications are incorporated herein by reference.

FIELD OF THE INVENTION

The present invention, in some embodiments thereof, relates in general to an RF device, and in particular to battery operated RF devices, such as RFID devices.

BACKGROUND OF THE INVENTION

There are many examples of battery operated radio frequency (RF) devices, such as RF Short Range Devices (SRD), RF Automatic Meter Reading (AMR) devices, active RFID devices and battery assisted passive RFID devices. A problem associated with RF devices which include an RF section and a power source, is that the battery impedance and/or battery metallic parts may affect the RF section of the device. This is especially so when the device includes a larger battery. As such, it is desirable to isolate the effect of the battery impedance and/or the battery metallic parts from the RF section of the device in order to improve the performance of balanced RF components such as: amplifiers, modulators, demodulators and antennas.

Methods used to RF isolate a battery from an RF section include physical separation of the battery whereby the battery is physically remote from the RF section. An additional solution is design of the antenna to prevent the problem. However, in certain battery operated radio frequency devices, wherein the antenna cannot be easily redesigned or wherein the device is thin and flexible, these methods may not be effective.

The following patents and publications were cited in a parent case, the disclosures of all of which are incorporated herein by reference: U.S. Pat. Nos. 4,703,327, 6,097,347 and 5,778,306, US patent publication numbers US 2005/092845 and US 2005/275591, PCT publication numbers WO 2006/031580 and WO 00/640004, EPO publication number EP 1,450,240 and GB patent publication GB 2,326,799.

RFID devices that include a battery utilize an ASIC for the RF components and such ASIC is putatively designed to not be affected by the battery, even if not additionally isolated therefrom. See for example, the EM4324 data sheet from December 2008 (after date of invention of instant application), showing that direct connection of an antenna and battery to an ASIC is a proper manner.

SUMMARY OF THE INVENTION

Some embodiments of the present invention relate to a discovery by the inventors that RFID devices, even with dedicated ASICs where the terminals (e.g., battery terminals) are isolated from each other (also at RF), exhibit a degradation, possibly caused by capacitances in the ASIC and an RF short provided by some battery designs. In an exemplary embodiment of the invention, a transmission line is formed of one or more an already existing conductors, and is in series with the battery, thereby preventing the battery from acting as a short on the ASIC and/or antenna. In an exemplary embodiment of the invention, the antenna is a dipole antenna or a patch antenna, or another antenna where the battery does not act as a ground plane.

Some embodiments of the present invention provide a battery operated RF device which includes an isolation circuit to isolate the effect of battery impedance or the battery metallic parts from the RF section of the device. In some embodiments, the isolation circuit comprises a quarter wavelength section or multiple quarter wavelength sections of transmission line at the device operating frequency. A quarter wavelength section of transmission line is effective over a relatively wide frequency band, such as for example f(quarter wavelength)±7.5%. The quarter wavelength transmission line section may be constructed in any suitable configuration, size or shape. In some embodiments the quarter wavelength section may be an open quarter wavelength transmission line section or shorted quarter wavelength transmission line section or multiple quarter wavelength open or shorted transmission line sections. In some embodiments the quarter wavelength section may be folded to minimize the space required. In some embodiments, such as for example wherein there is a larger space between the power source and the RF section of the device, multiple quarter wavelength sections may be used.

The term 'RF isolate' as used herein with respect to some embodiments, refers to eliminating or reducing the effect of low battery impedance on the radio frequency of a device. Specifically, the transmission line isolates the balanced RF components from the power source so that the power source does not degrade the performance of the balanced RF components.

In accordance with some embodiments of the invention, RF isolation is used to isolate the effect of a battery or conduction lines thereof and/or of RF leakage in an ASIC, from an antenna component. In an exemplary embodiment of the invention, the device in which the antenna is isolated is an active RFID or a battery assisted passive RFID, for example, in the UHF band.

In some embodiment of the present invention a section of quarter wavelength transmission line or odd multiple sections of quarter wavelength, at operating frequency of the RFID transponder is used to connect the battery to the ASIC and the antenna. In an exemplary embodiment of the invention, the quarter wavelength transmission line converts the low RE impedance of the battery into high impedance at the antenna and ASIC end and provides a desired RE isolation between the battery, the antenna and the ASIC, and optionally prevents deterioration of the antenna performance. In an exemplary embodiment of the invention, the transmission line conductors present negligible resistance to the direct current of the battery and do not effect the battery operation.

In some embodiments, the quarter wavelength section is folded to minimize the space required. Odd multiple quarter wavelength sections may be used, for example, for larger distance between the battery and the RFID ASIC.

In some embodiments, the two battery conductors act as a single quarter-wavelength transmission line. Optionally or alternatively, at least one (or only one) of the conductors is formed as a quarter wavelength transmission line, optionally shorted and/or folded.

Optionally, multiple shorted quarter wavelength sections are provided. Optionally, the sections each have different wavelengths (e.g., 3%, 5%, 10% or 15% different), so as to provide a greater isolation bandwidth for the RFID device.

In an exemplary embodiment of the invention, the ASIC is a three contact pad ASIC in which one pad is shared between the battery and the antenna, and one each of the remaining is used by the antenna and the battery, respectively. Optionally, the battery is isolated only at this shared pad. In other embodiments the ASIC is a four contact ASIC, with optionally RF isolated battery terminals/ports and two RF ports for an antenna.

In an exemplary embodiment of the invention, a folded quarter wavelength transmission line is used while positioning the battery near the antenna.

There is provided in accordance with an exemplary embodiment of the invention, an RFID device comprising:

(a) electronic circuitry suitable for an RFID device comprising a radio frequency section;

(b) an antenna;

(c) a battery which provides the device with power; and (d) at least one quarter wavelength transmission line coupled between the battery and one or both of the electronic circuitry and the antenna.

Optionally, said circuitry is mounted on a substrate. Optionally, the transmission line is formed by one or more of a printing, a laminating, a depositing, a defusing or a placement process on the substrate or on an auxiliary substrate that is mounted on or proximate to the substrate of the device. Optionally, the printing process of RE isolation is integrated with the printing process of the antenna and other conductors on the substrate of the RFID device.

In an exemplary embodiment of the invention, the circuitry includes RF isolation between two terminals thereof that receive power from said battery. Optionally or alternatively, the transmission line is formed of two parallel conductors that couple power from said battery to said one circuitry.

In an exemplary embodiment of the invention, the transmission line is formed of a single conductor used to couple power from said battery to said one circuitry, said conductor folded to form two parallel and shorted lines of the transmission line.

In an exemplary embodiment of the invention, the antenna is a high impedance antenna. Optionally or alternatively, the battery is a low-impedance battery.

In an exemplary embodiment of the invention, the at least one quarter wavelength transmission line is folded.

In an exemplary embodiment of the invention, the at least one quarter wavelength transmission line comprises at least one shorted quarter wavelength transmission line section. Optionally, the RFID device includes only a single shorted quarter wavelength transmission line sections.

In an exemplary embodiment of the invention, said at least one quarter wavelength transmission line comprises two shorted quarter wavelength transmission line sections and wherein each of the two shorted quarter wavelength transmission line sections isolates one terminal of the battery to one terminal of the electronic circuitry.

In an exemplary embodiment of the invention, the electronic circuitry is a dedicated RFID ASIC.

In an exemplary embodiment of the invention, the circuitry includes a port connected to the antenna and the battery, which port is connected to said transmission line.

In an exemplary embodiment of the invention, the transmission line at least partly blocks RF leaks inside the circuitry from causing battery loading.

In an exemplary embodiment of the invention, said transmission line interconnects said battery to said antenna.

In an exemplary embodiment of the invention, the RFID device is a battery assisted passive RFID device or an active RFID device.

In an exemplary embodiment of the invention, the transmission line is formed from at least one conductor connecting said battery to said circuitry or said antenna.

In an exemplary embodiment of the invention, the transmission line is realized without adding components or assembly acts to said RFID device over a same device with same components and without a transmission line.

In an exemplary embodiment of the invention, the RFID device consists essentially of said antenna, said battery, said circuitry and said transmission line.

In an exemplary embodiment of the invention, the transmission line comprises an odd multiple of wavelength of the RFID device in effective length.

In an exemplary embodiment of the invention, the transmission line is wrapped, at least in part.

In an exemplary embodiment of the invention, said transmission line is a transmission line formed of two conductors, a first conductor which connects a terminal of said battery to said circuitry and a second conductor which connects a second terminal of said battery to said antenna and thereby to said circuitry. Optionally, said transmission line is folded to form at least three sections and wherein said antenna is a dipole-type antenna.

In an exemplary embodiment of the invention, said transmission line is a shorted transmission line formed of a single conductor folded so two sections thereof are parallel and form a shorted transmission line two conductors, said single conductor connecting a terminal of said battery to said circuitry and also comprising a second conductor which connects a second terminal of said battery to said antenna and thereby to said circuitry. Optionally, said second conductor is also formed into a shorted transmission line.

There is provided in accordance with an exemplary embodiment of the invention, a method of RF isolating a power source in an RFID device, comprising connecting a power source to one or both of electronic circuitry and an antenna via at least one quarter wavelength transmission line.

In an exemplary embodiment of the invention, the method includes printing or otherwise depositing a transmission line and a battery serving at least partially as said power source on a same or different substrate of the device.

In an exemplary embodiment of the invention, the method includes compensating for an RF interaction between the circuitry, battery and antenna by said transmission line.

There is provided in accordance with an exemplary embodiment of the invention, a method of RFID device design, comprising:

(a) providing an RFID circuit without separable RF isolation elements; and (b) selecting a battery having an internal resistance high enough to avoid degradation of more than 4 dB in a circuit using the battery.

BRIEF DESCRIPTION OF DRAWINGS

The principles and operation of a battery operated RF device comprising an RF isolated battery according to some non-limiting examples of the present invention may be better understood with reference to the drawings and accompanying descriptions, in which.

DETAILED DESCRIPTION

Figure 1:
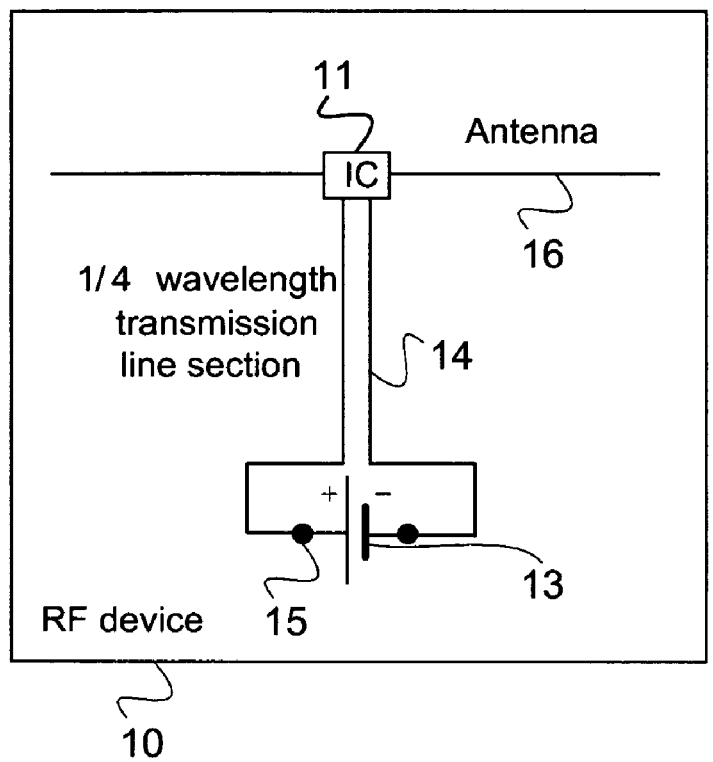
FIG. 1 is a schematic representation of an RF device comprising an open quarter wavelength transmission line to facilitate RF isolation of the battery according to an embodiment of the present invention.

In the following description of different embodiments of the invention, identical or similar reference numerals will generally be used to refer to identical components or to components that fulfill a common function.

FIG. 1 shows a schematic representation of a device 10 according to one embodiment of the present invention. As can be seen from FIG. 1, the device includes electronic circuitry 1, such as an integrated circuit which includes a RF section 12 (shown in FIG. 2), at least one power source which may include a battery 13 and an isolation circuit 14 to RF isolate the at least one power source. Optionally, the power source 13 may be removably coupled to the isolation circuit 14 by respective power connectors 15. In some embodiments, device may include an antenna 16.

The isolation circuit 14 that is used to RF isolate the power source 13 may include an open quarter wavelength transmission line section. Examples of quarter wavelength transmission line section include, but are not limited to, parallel conductor section, coaxial section, strip line section, or microstrip section of transmission line. The transmission line may be constructed using any suitable technique. In one embodiment a suitable printing technology may be used and may be implemented within the printing of the device circuitry such as an etched circuit board or conductive ink printed circuit.

In some embodiments the transmission line is disposed between the RF section 12 and the at least one power source 13. The transmission line includes a first end and a second end. The transmission line may be electrically coupled such as connected at one end to the at least one power source and at a second end to the electronic circuitry. The transmission line may be folded or unfolded.

In the embodiment shown in FIG. 1, the low impedance of the battery 13 is transformed by the quarter wavelength transmission line section to high impedance with a negligible loading effect on the RF section 12 (shown in FIG. 2) of the device 10. The transmission line acts as a low-to-high impedance transformer at RF, while at low frequencies i.e. DC, it provides a physical connection. Thus, the transmission line section has substantially no effect on the DC connection between the battery 13 and the device 10.

The power source 13, which facilitates powering of the RF device, may comprise one or more suitable energy sources, such as a battery, although the RF isolation provided by the isolation circuit 14 is also effective when other energy sources are employed as described in more detail below. The power source may optionally include circuitry (not shown) configured to increase or otherwise control the supplied voltage. The battery 13 is any suitable battery of any suitable size or shape, which in some embodiments may be a thin battery. In some embodiments, the battery 13 comprises at least one thin and flexible battery, such as the batteries produced by Power Paper Ltd. (Petah-Tikva, Israel). Such thin and flexible batteries are described, for example, in U.S. Pat. Nos. 5,652,043, 5,897,522 and 5,811,204, whose disclosures are incorporated herein by reference. In some embodiments, the battery 13 may be formed using a printing process whereby the battery is printed or otherwise deposited either directly onto the same substrate as the device 10 or on a different substrate that is then mounted on or proximate to the device 10. For example, the battery 13 could be printed or otherwise deposited on an adhesive label that is then simply affixed to the device substrate using suitable means such as for example conductive ink and/or conductive adhesive. If, in such an embodiment, the transmission line is also printed or otherwise deposited on the substrate, this can be done after the battery 13 is deposited in order to ensure that the transmission line effects proper connection with the battery terminals. Alternatively, when the battery 13 is first deposited on a label, conductive tracks that are connected to the battery terminals can be formed on the lower surface of the label for contacting the transmission line. In any case, the order of depositing the battery and the transmission line is not important. In the case that the battery is printed or otherwise deposited directly on to the device substrate, discrete power connectors are not required but such connectors are nevertheless realized functionally by the isolation circuit 14 which must be electrically connected to the battery. In some embodiments, at least one of the components of device 10, such as the battery 13 may be applied in any suitable way directly on to the substrate of an end product to which the device 10 is to be attached, such as on to the packaging of goods to be tracked. Such an embodiment may facilitate a product integrally formed with the device of the present invention.

The circuitry 11 may include an integrated circuit and/or discrete components. The circuitry includes an RF section 12

(shown in FIG. 2), which may include any suitable RF components as known in the art and as used in battery operated RF devices.

Figure 2:
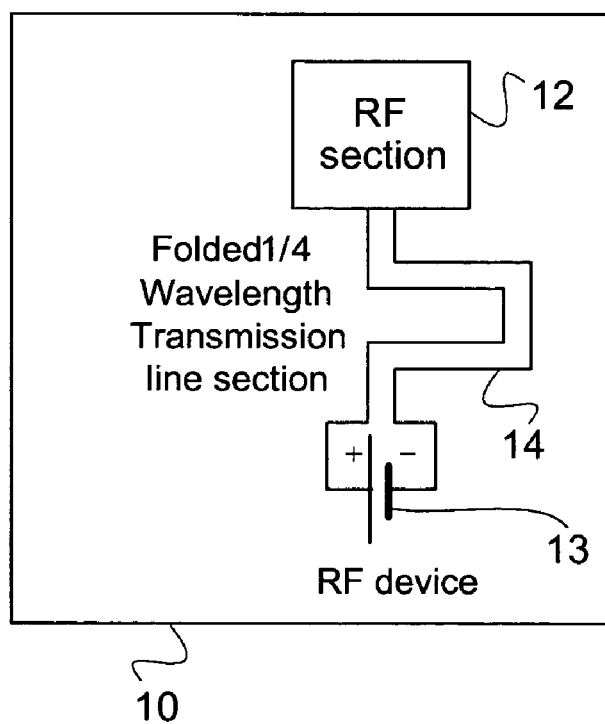
FIG. 2 is a schematic representation of an RF device comprising a folded quarter wavelength transmission line to facilitate RF isolation of the battery according to an embodiment of the present invention.

FIG. 2 shows a schematic representation of a device 10 according to another embodiment of the present invention. As can be seen from FIG. 2, the device 10 is substantially the same as in FIG. 1, except that that the quarter wavelength transmission line section 14 is a folded quarter wavelength transmission line section. A folded transmission line may be used to save space.

Figure 3:
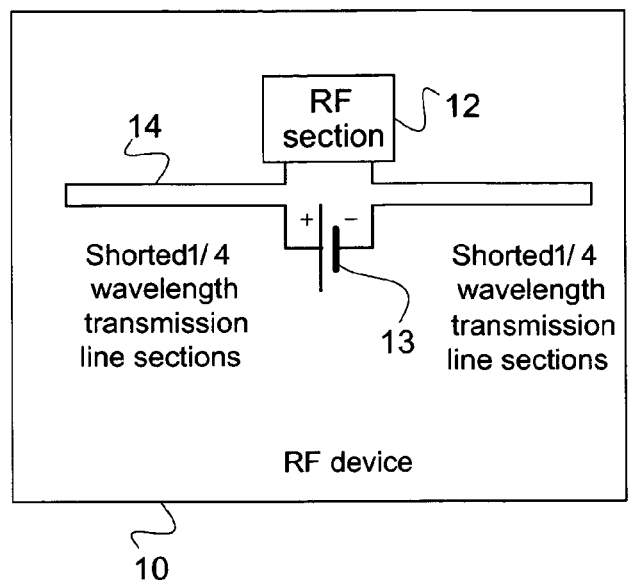
FIG. 3 is a schematic representation of an RF device comprising two shorted quarter wavelength transmission lines to facilitate RF isolation of the battery according to an embodiment of the present invention.

FIG. 3 shows a schematic representation of a device 10 according to another embodiment of the present invention. In the device shown in FIG. 3 the isolation circuit 14 that is used to RF isolate the power source 13 includes two shorted quarter wavelength sections. The shorted quarter wavelength sections provide very high impedance between the power connectors 15 coupled to the battery terminals and the RF section 12 of the device. In some embodiments the shorted quarter wavelength sections provide very high impedance between the battery terminals and the RF section 12 of the device. Each of the two shorted quarter wavelength transmission line sections 14 may facilitate connection of one of the terminals of the at least one power source to one terminal of the electronic circuitry. The transmission lines do not adversely affect the DC connection between the battery and the device.

Figure 4:
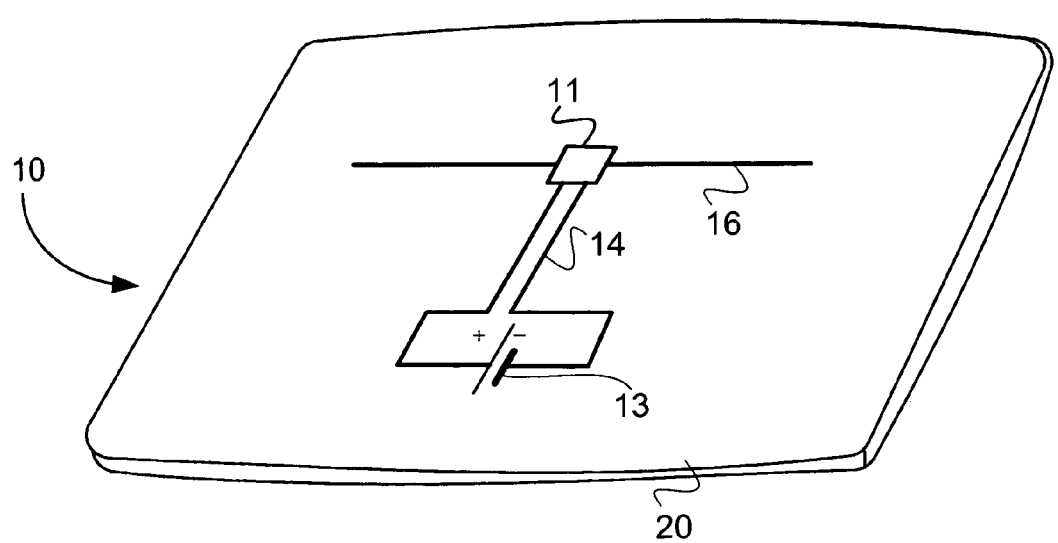
FIG. 4 is a pictorial representation of an RFID according to an embodiment of the present invention.

FIG. 4 is a pictorial representation of an RF device 10 in the form of an RFID according to an embodiment of the present invention having a substrate 20, on which there are disposed an electronic circuit 11 comprising a radio frequency section coupled to a battery 13 via at least one quarter wavelength transmission line 14, which may be in suitable form including any of the forms described above with reference to FIGS. 1 to 3. In one embodiment, the battery 13 and the transmission line 14 are printed directly on the substrate 20. Alternatively, the battery and/or the transmission line may be deposited on an auxiliary substrate that is then mounted on or proximate to the device substrate. In some embodiments, the substrate 20 may be the substrate of an end product to which the device 10 is to be attached, such as the wrapping of goods to be tracked. In such an embodiment, device 10 may be integrally formed with the product to be tracked.

Although the invention has been described by way of example with regard to a battery-operated RF device, it will be appreciated that the ¼-wavelength transmission line may be used to isolate even a rectified mains operated AC power supply. Mains operated devices are not so sensitive to size and cost therefore other means of isolation are conventionally used such as an LC filter and/or physical separation. Thus, more generally, the invention is also applicable for use with power sources of portable RF devices other than batteries. Such power sources may be fuel cells or solar cells, where the resulting RF isolation provided by the invention will improve the device performance. Likewise, such power sources may employ a battery backup for which RF isolation is also provided.

The RF device may be an RFID device such as an RFID label. A ¼ wavelength transmission line printed on the RFID substrate, for example, has negligible effect on the form factor and the cost.

FIGS. 5-9 show specific examples of implementations of some aspects of the present invention to RFID devices. Similar elements are referenced with similar numbers and may not be described repeatedly. These (and previous) examples are meant to be illustrative of certain principles, and as such, features of one illustrated embodiment may be combined with features of other embodiments, in an actual implementation.

In an exemplary embodiment of the invention, an RFID device is a small RF device which, optionally, sends a short stream of data in response to an interrogation. In an exemplary embodiment of the invention, the RFID device is a battery assisted passive device in which the antenna is not used for power collection but only for transmission and/or backscattering of an interrogation signal. In an exemplary embodiment of the invention, the RFID device is thin and flexible and/or uses a thin battery and/or stays operational for, for example, 6 months, 1 year, 2 years or more. In an exemplary embodiment of the invention, the RFID or transponder comprises an antenna, an ASIC (or other integrated circuit) and a battery to provide power as needed. Generally, the devices are very cost sensitive.

In an exemplary embodiment of the invention, the RFID label transponder consists of an inlay layer, a protective layer and adhesive layers. Optionally, the inlay layer is made of a polyester or impregnated paper substrate, 50-100 μm thick, on which the antenna and ASIC are assembled.

Various technologies may be used to deposit the antenna on the substrate, for example, conductive ink printing, conductive ink receptive coating, copper etching and metallic foil lamination.

In an exemplary embodiment of the invention, the ASIC is placed and connected of the ASIC to the antenna using "Flip-Chip" technology.

In an exemplary embodiment of the invention, active and battery assisted label transponders include also a power source (battery) to provide the power required for their operation. Optionally, the battery is attached to the substrate and connected to the ASIC by conductors deposit on the substrate in the same process of the antenna deposit.

Figure 5:
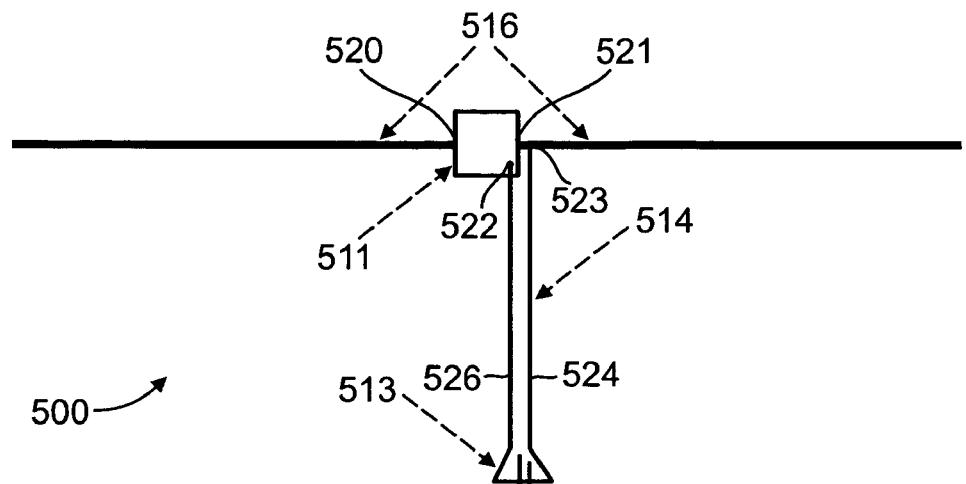
FIG. 5 shows an exemplary embodiment of the present invention where a UHF BAP or Active RFID label includes a dipole antenna and an ASIC and a battery is connected to the ASIC via a quarter wavelength transmission line section.

FIG. 5 shows an RFID device 500, in which an ASIC 511 (or other circuitry) is attached to a dipole antenna 516 and a battery 513. In the embodiment shown, ASIC 511 includes three contacts/pads for attachment thereto, a pad 520 attached to the antenna, a pad 522 attached to a pole of the battery (here shown as a positive pole, but could also be negative, depending on ASIC design) and a pad 521 used both for antenna attachment and for attachment to the other pole of the battery. Optionally, as shown, the battery is attached directly to the antenna (e.g., at 523) which is attached to pad 521. In the embodiment shown, a transmission line 514 is formed from two battery conductors 526 and 524. In an exemplary embodiment of the invention, transmission line 514 in series (at RF frequencies) between the battery and the ASIC prevents the battery from acting as a low impedance short and/or otherwise interfere with the ASIC and antenna. The inventors have discovered that while the contacts for ASICS are generally isolated for RF, attaching a low impedance battery can cause degradation in the device, for example, without isolation provided by the transmission line the battery low impedance for RF reduces the antenna gain, and backscatter. In an exemplary embodiment of the invention, conductors 524 and 526 have a negligible DC resistance.

In an exemplary embodiment of the invention, line 514 and/or other conductors, such as antenna, battery conductors and transmission line sections are formed by one or more of printing, laminating, diffusing and placement, including, without limit, for example, conductive ink printing, conductive ink receptive coating, metal foil etching and/or metallic foil lamination. In an exemplary embodiment of the invention, the printing process of the RF isolation means is integrated with the printing process of the antenna and/or other conductors. Such printing may be, for example, on a separate layer or on a same substrate as the battery and/or antenna.

In some embodiments of the invention, the quarter wavelength transmission line does not provide infinite impedance, however, the battery RF impedance as converted by the isolation section is sufficient to prevent, for example, 50%, 70%, 90%, 95% or more of degradation caused by attaching a battery, for example, a low impedance battery to the ASIC/antenna. For example, the provided impedance can be 50 ohm, 100 ohm, 200 ohm, 500 ohm, 800 ohm, 1000 ohm, 1500 ohm, 2000 ohm or intermediate or greater resistances. Optionally or alternatively, the impedance is provided to be a multiple of the antenna resistance, for example, being a factor of 2, 4, 8, 10, 20 or more of the impedance of the antenna.

In an exemplary embodiment of the invention, this impedance is provided between terminals on an ASIC that are putatively isolated (two battery terminals or a battery terminal and an antenna terminal). It is noted that the isolation described in some embodiments herein is between RF components (the ASIC and antenna) and non-RF components (the battery).

In an exemplary embodiment of the invention, the ASIC is an EM 4324 by EM MICROELECTRONIC-MARIN SA (Switzerland) and the battery is a STD3 by PowerID (Petach Tikva, Israel).

Figure 6:
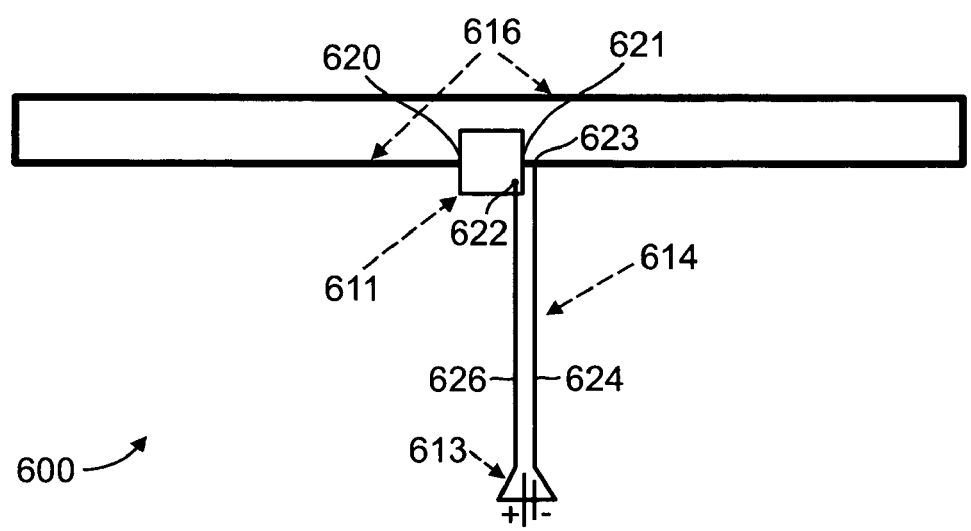
FIG. 6 shows another exemplary embodiment of the present invention where a UHF BAP or Active RFID label includes folded dipole antenna and an ASIC and a battery is connected to the ASIC via a quarter wavelength transmission line section.

FIG. 6 shows an RFID device 600, similar to that of FIG. 5, except that the antenna is a folded dipole antenna. It should be noted that high impedance antennas, such as a folded dipole antenna are generally more sensitive to effects of the battery, which effects are optionally solved using transmission lines as shown herein, even if not optimal. Optionally, a transmission line as described herein is used with other types of balanced antennas, such as other dipole antennas and patch antennas.

Figure 7:
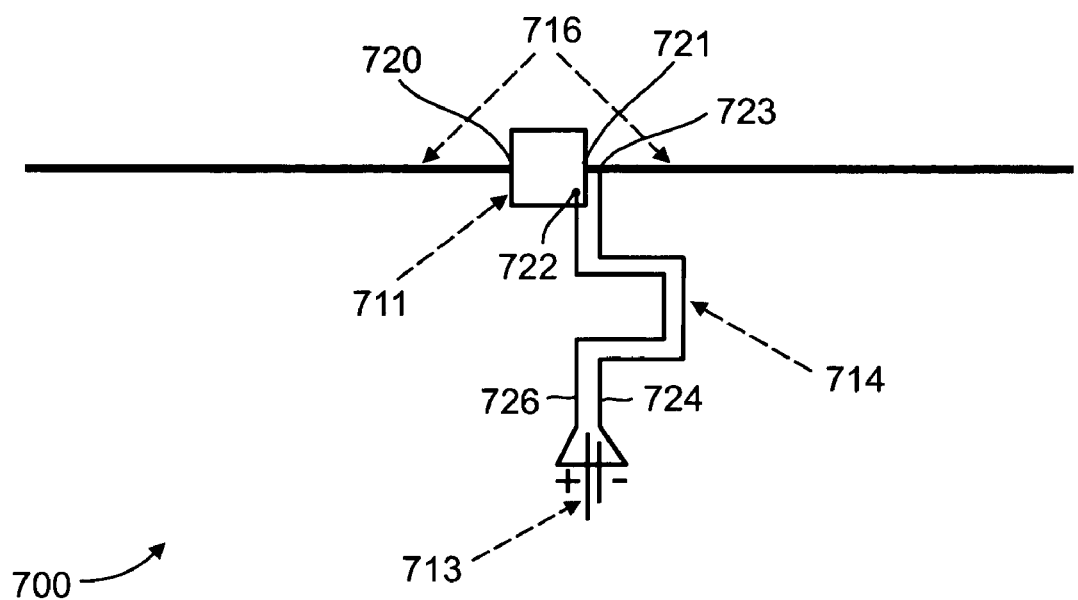
FIG. 7 shows another exemplary embodiment of the present invention, related to that of FIG. 5, where the quarter wavelength transmission line section is folded, potentially saving label substrate area.

FIG. 7 shows an RFID device 700, in which an ASIC 711 (or other circuitry) is attached to a dipole antenna 716 and a battery 713. In the embodiment shown, ASIC 711 includes three contacts/pads for attachment thereto, a pad 720 attached to the antenna, a pad 722 attached to a pole of the battery and a pad 721 used both for antenna attachment and for attachment to the other pole of the battery. Optionally, as shown, the battery is attached directly to the antenna (e.g., at 723) which is attached to pad 721. In the embodiment shown, a transmission line 714 is formed from two battery conductors 726 and 724. In the embodiment shown, transmission line 714 is folded, possibly allowing to reduce the size of the RFID device and/or locate the battery closer to the antenna. While the figure shows a single fold (location where the direction of the transmission line changes), multiple folds may be provided, for example, 2, 3, 4, 5, 6 or more separate sections may be provided. Optionally or alternatively, the line is (or includes) curved, for example, in sections or as a continuous curve, rather than straight.

While the exact dimensions may depend on the exact design of the system, following are exemplary measurements calculated as being useful for a folded transmission line at 0.9 GHz, by simulation. In an exemplary embodiment of the invention, the separation between conductors 726 and 724 is about 0/4 mm, but larger (e.g., by a factor of 2) or smaller sizes may be used. Optionally, the wide of each conductor is 0.3 mm, but larger (e.g., by a factor of 2) or smaller sizes may be used. Optionally, the separation between parallel sections of the transmission line is at least 3 mm (e.g., to reduce capacitance). Other sizes may be provided depending on the design and circuit parameters. Optionally or alternatively, a similar separation is provided between the antenna and the transmission line, to prevent mutual interference. Optionally, the transmission line passes by the antenna for at least 10%, 20%, 40%, 60% or intermediate or greater percentages of the length of the transmission line.

Optionally, the length of the transmission line is about 70 mm. It is noted that in this and other embodiments while the length of the conductors may be increased, the cost of this is often negligible, while no additional components and/or connections need be made, whose cost might not be negligible. Conversely, where needed, the length of the transmission line may be greater, to accommodate odd multiples of quarter wavelength sections of the transmission line.

In some embodiments, a battery is chosen with a higher internal resistance (e.g., 50 ohm, 70 ohm, 100 ohm, 150 ohm, 200 ohm or more) which may reduce the interference between the battery and the antenna (and ASIC) sufficiently to allow a transmission line to be avoided and/or allow a transmission line to be useful for a wider range of frequencies and/or to be made with a lower quality factor and/or to less restrictive tolerances. In some cases, such a battery with a high internal resistance is not suitable, however. Optionally, such a battery has an internal resistance/impedance of the exemplary above factors and impedances discussed above for the transmission line. From considerations of power efficiency, a low internal resistance such as 40 ohm, 30 ohm or lower is generally desirable.

In this and other embodiments, the transmission line may be wrapped (e.g., with an outer protective coating or an inner core), for example, including an air core, dielectric core or metal core. Optionally, the core is provided on a different layer of laminate used in construction or deposited before or after the transmission line.

Figure 8:
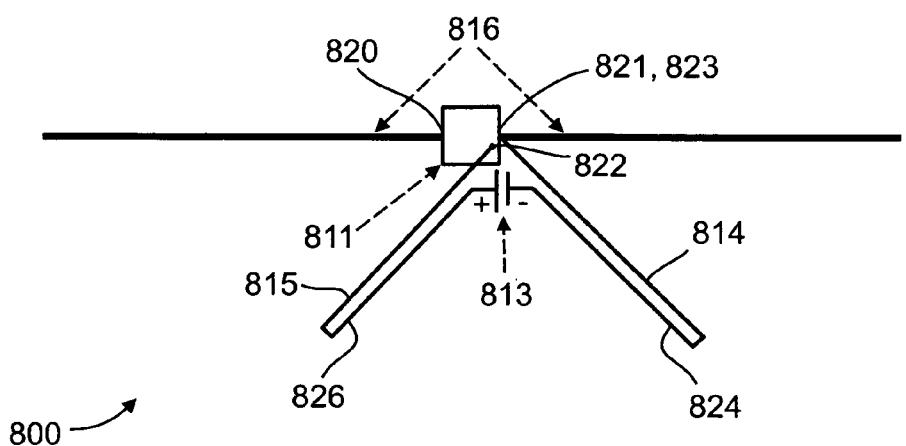
FIG. 8 shows another exemplary embodiment of the present invention where an alternative implementation, of two shorted quarter wavelength sections, is used to provide a desired RF isolation between an ASIC, an antenna and a battery.
Figure 9:
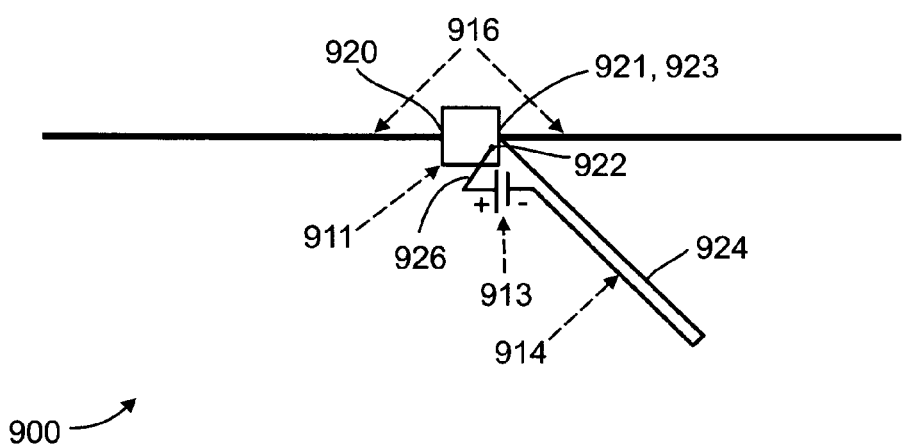
FIG. 9 shows an exemplary embodiment of the present invention, related to that of FIG. 8, where a battery pole which is connected to the antenna (or shares a pad therewith) is connected thereto via a single shorted quarter wavelength transmission line.

FIGS. 8 and 9 show embodiments where a transmission line is formed from a single one of the conductors of the battery and optionally shorted for DC.

In FIG. 8, each of conductor lines 824 and 826 is shaped into a transmission line, 814 and 815, respectively. In each transmission line, the conductor is folded so that it forms two parallel sections. One each of such a transmission line is shorted for DC. The other end of the line connects to the ASIC and battery (e.g., the transmission line has two parallel parts of the conductor. This can allow the battery to lie close to the ASIC (811). Optionally, the transmission lines lead away from the battery and/or antenna.

FIG. 9 shows an alternative where only one of conductors 924 and 926 is made into a quarter wavelength transmission line. Optionally, it is the conductor which shares a port to the ASIC with the battery and it is in series with the battery. Optionally, the port is selected to allow the transmission line to be as close as possible to the component whose function is deteriorated, e.g., the antenna.

As in the previous embodiments, the shorted transmission line(s) may be folded and/or may be odd multiples (e.g., 1, 3, 5, 7) of quarter wavelength. A transmission line set up may also include both sections formed from two conductors and shorted sections formed of folded conductors.

In an alternative embodiment of the invention, the two shorted quarter wavelength sections of FIG. 8, or odd multiples of section in any figure, are selected to have different wavelengths. This may allow a broader wavelength of operation for the RFID tag at which the isolation is useful.

Figure 10:
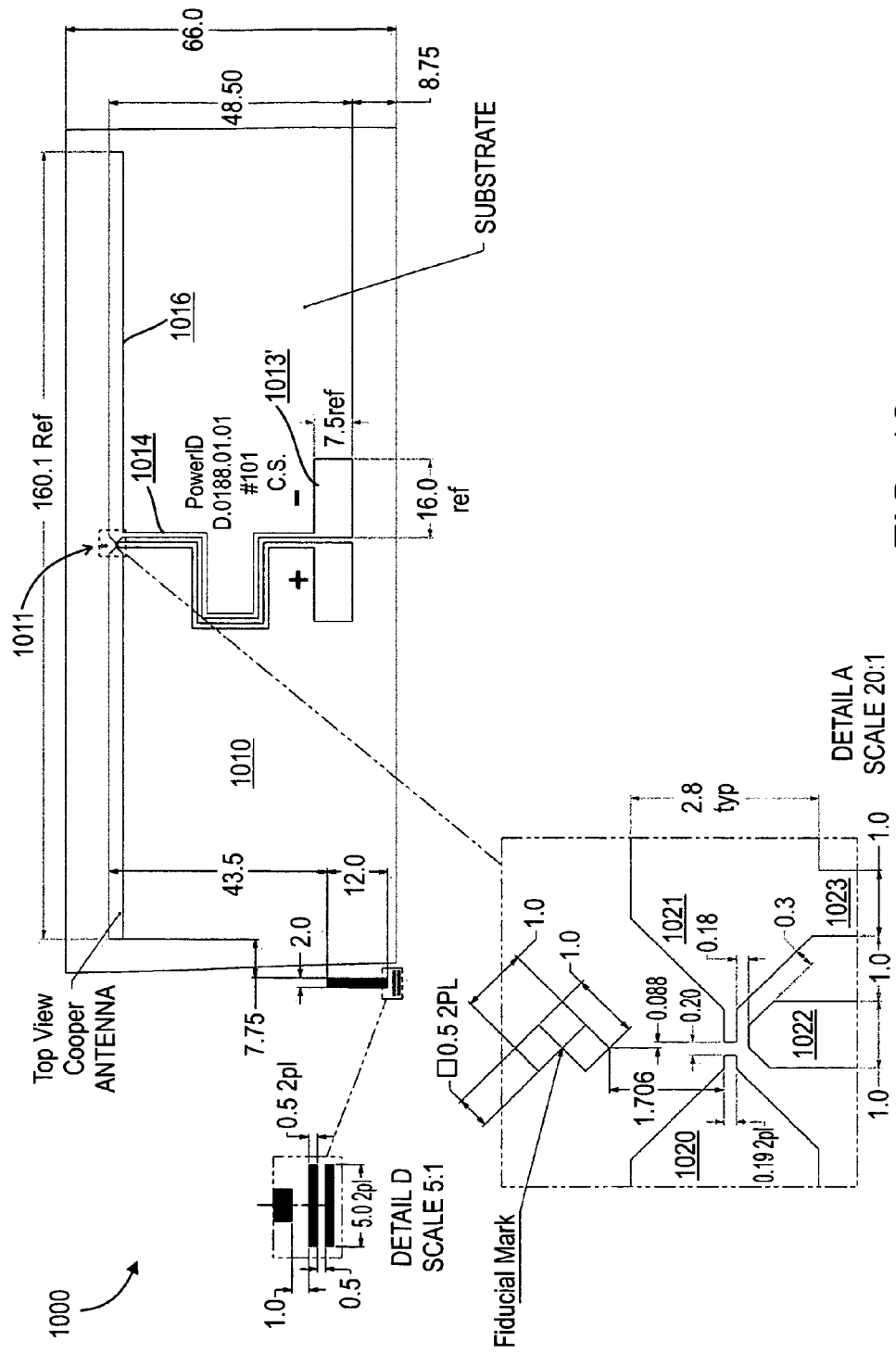
FIG. 10 is a schematic showing of an RFID device portion with a folded transmission line in accordance with an exemplary embodiment of the invention.

FIG. 10 is a schematic showing of an RFID device portion 1000 with a folded transmission line in accordance with an exemplary embodiment of the invention. An antenna 1016 is formed on a substrate 1010. A transmission line 1014 interconnects battery contacts 1013' with an ASIC connection location 1011. A blow-up of connection location 1011, shows contacts 1020, 1021 and 1022 of the ASIC and an interconnection 1023 between the antenna and the transmission line.

Figure 11:
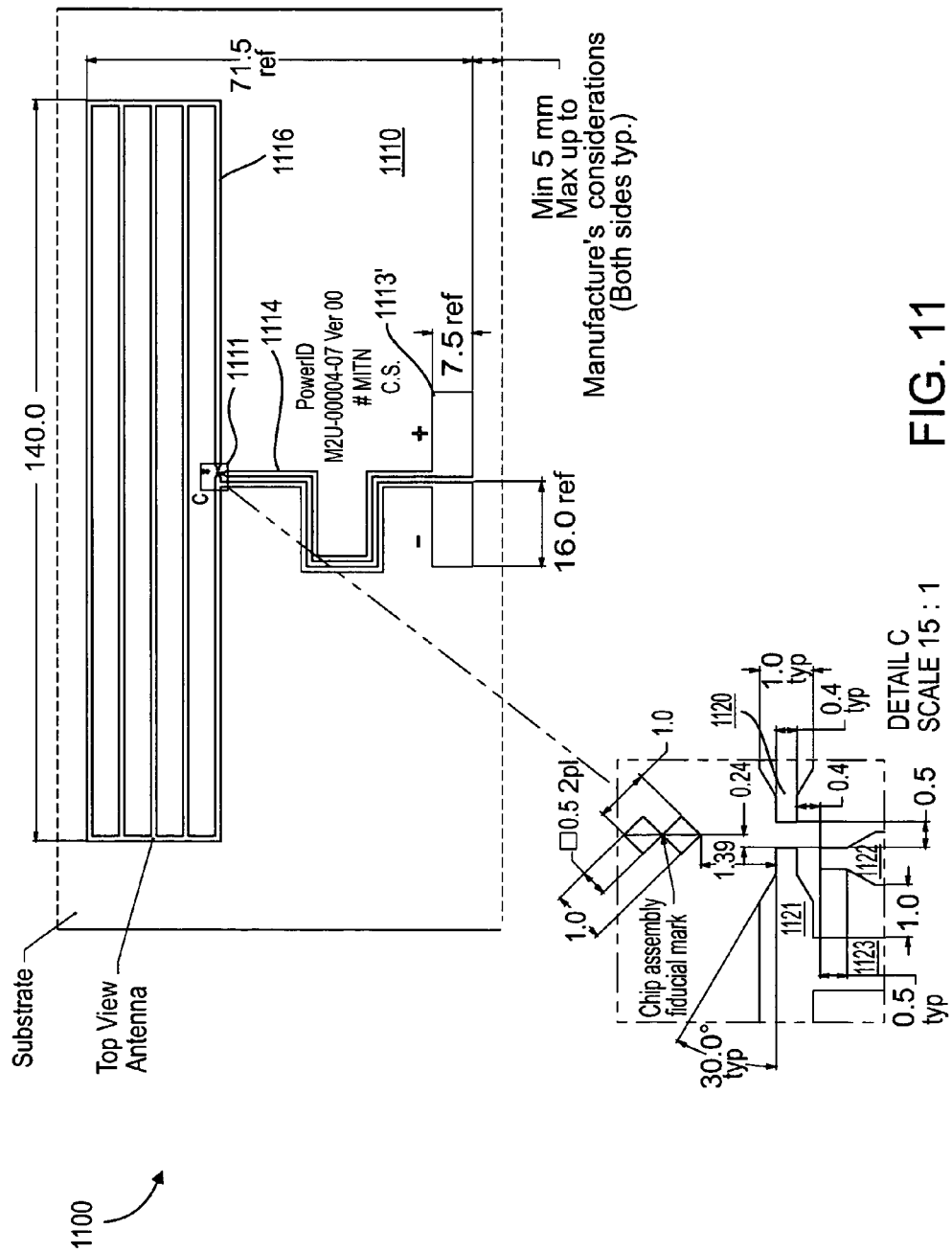
FIG. 11 is a schematic showing of an RFID device portion with a multi-folded antenna and a folded transmission line in accordance with an exemplary embodiment of the invention.

FIG. 11 is a schematic showing of an RFID device portion 1100 with a multi-folded antenna and a folded transmission line in accordance with an exemplary embodiment of the invention. A multi-folded dipole antenna 1116 is formed on a substrate 1110. A transmission line 1114 interconnects battery contacts 1113' with an ASIC connection location 1111. A blow-up of connection location 1111, shows contacts 1120, 1121 and 1122 of the ASIC and an interconnection 1123 between the antenna and the transmission line. There is an optional border of, for example, 5 mm or more between the electronic components and the edge of the RFID device. A fiduciary mark is optionally provided at location 1111 to assist in manual and/or automatic positioning of the ASIC.

Figure 12A:
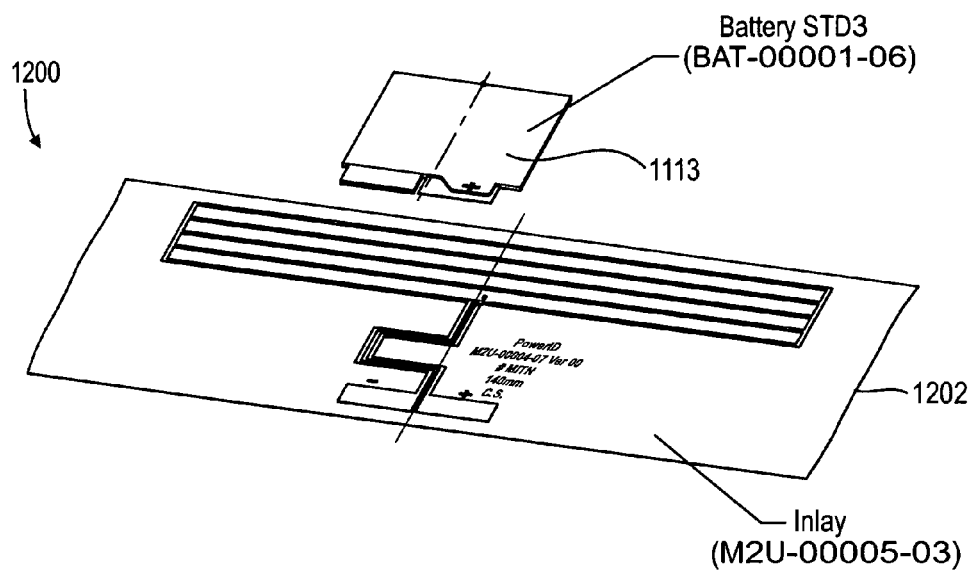
FIG. 12A and FIG. 12B are, respectively, an exploded view and an assembled view of an RFID device using the design of FIG. 11, in accordance with an exemplary embodiment of the invention.
Figure 12B:
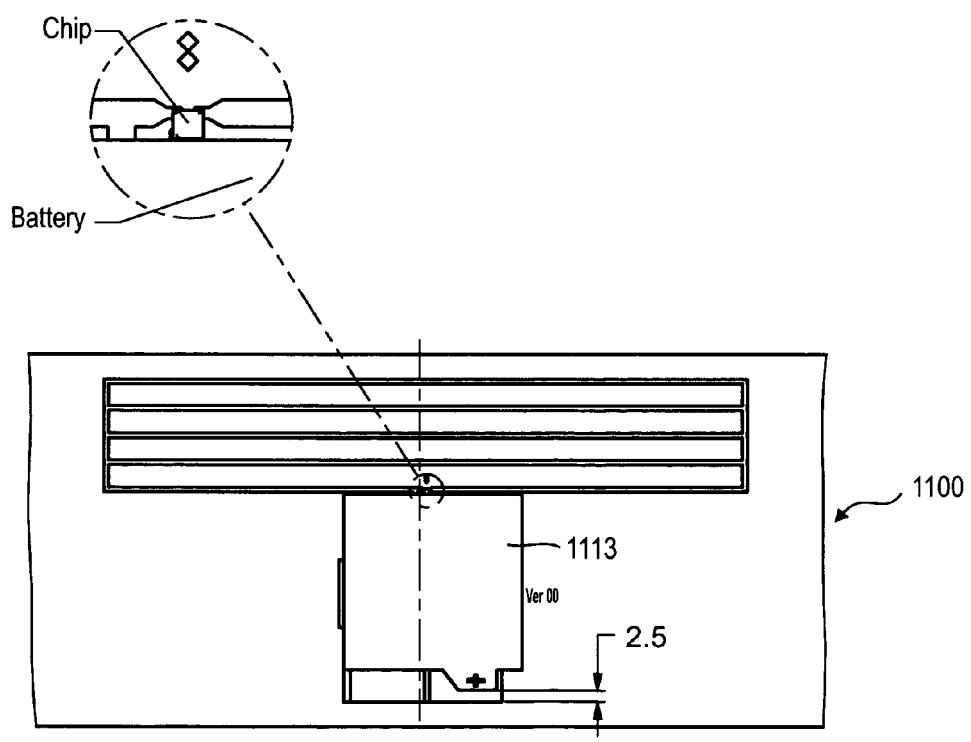

FIG. 12 is an exploded view of an RFID device 1200 using the design of FIG. 11, in accordance with an exemplary embodiment of the invention. Element 1100 is what is shown in FIG. 11. An inlay 1202 matches element 1100. A separate battery 1113 is shown. It is noted that the battery contacts are placed in a direction away from the antenna to allow more length for the transmission line. This may not be needed in the design of FIG. 9, but may still be useful even there, to distance the transmission line form the antenna. Optionally, the layers are self adhesive to the other layers. Inlay 1202 may include a peel-off adhesive layer for attachment to items. Optionally, the battery does not cover the ASIC.

It will be appreciated that while the invention has been described with regard to an RF device having a battery or other power source for providing the device with power, the battery or other power source may be removable. For example, the power connectors 15 may serve to electrically connect positive and negative battery terminals to the electronic circuitry. In other cases, the device may include the battery or other power source as an integral unit. However, even in such cases, the battery or other power source must still be electrically connected to the electronic circuitry via the transmission line, so that the interface between the battery and the transmission line serves as the power connectors 15. In the case where the battery and the transmission line are both printed or suitably deposited on the device substrate, the power connectors may then be realized by the transmission line itself.

It will be appreciated by persons skilled in the art that the present invention is not limited to what has been particularly shown and described herein. Rather, the scope of the present invention is defined by the appended claims and includes both combinations and subcombinations of the various features described herein as well as variations and modifications thereof which would occur to persons skilled in the art upon reading the foregoing description. Accordingly, it is intended to embrace all such alternatives, modifications and variations that fall within the scope of the appended claims. Also it is to be understood that the phraseology and terminology employed herein is for the purpose of description only and should not be regarded as limiting.

The invention claimed is:

1. An RFID device comprising:
   (a) electronic circuitry suitable for an RFID device comprising a radio frequency section including first and second ports for connection of a power source thereto for providing power to said circuitry;
   (b) an antenna;
   (c) a battery having two terminals which provides the circuitry with power; and
   (d) at least one transmission line having an effective length of one quarter wavelength coupled between both terminals of the battery and said first and second terminals ports.

2. A device according to claim 1, wherein said circuitry is mounted on a substrate.

3. The RFID device according to claim 2, wherein the transmission line is formed by one or more of a printing, a laminating, a depositing, a defusing or a placement process on the substrate or on an auxiliary substrate that is mounted on or proximate to the substrate of the device.

4. The RFID device according to claim 3, wherein the forming process of RF isolation is integrated with the forming process of the antenna and other conductors on the substrate of the RFID device.

5. The RFID device according to claim 1, wherein at least one of the transmission lines is formed of two parallel conductors that couple power from the two terminals of said battery to first and second terminals of said circuitry.

6. The RFID device according to claim 1, wherein the at least one transmission line is formed of a single conductor used to couple power from said battery to said one circuitry, said conductor folded to form two parallel and shorted lines of the transmission line.

7. The RFID device according to claim 1, wherein the antenna is a high impedance antenna.

8. The RFID device according to claim 1, wherein the battery is a low-impedance battery.

9. The RFID device according to claim 1, wherein the at least one quarter wavelength transmission line is folded.

10. The RFID device according to claim 1, wherein the at least one quarter wavelength transmission line comprises at least one shorted quarter wavelength transmission line section.

11. The RFID device according to claim 10, wherein at least one of said at least one quarter wavelength transmission line comprises two shorted quarter wavelength transmission line sections and wherein each of the two shorted quarter wavelength transmission line sections isolates one terminal of the battery from one terminal of the electronic circuitry.

12. The RFID device according to claim 1, wherein the electronic circuitry is a dedicated RFID ASIC.

13. The RFID device according to claim 1, wherein the second port is connected to the antenna.

14. The RFID device according to claim 8, wherein the transmission line at least partly blocks RF leaks inside the circuitry from causing battery loading.

15. The RFID device according to claim 1, wherein a transmission line of said at least one transmission line interconnects said battery to said antenna.

16. The RFID device according to claim 1, wherein the RFID device is a battery assisted passive RFID device or an active RFID device.

17. The RFID device according to claim 1, wherein the at least one transmission line is realized without adding components or assembly acts to said RFID device over a same device with same components and without a transmission line.

18. The RFID device according to claim 1, wherein the RFID device consists essentially of said antenna, said battery, said circuitry and said at least one transmission line.

19. The RFID device according to claim 1, wherein the transmission line is wrapped, at least in part.

20. The RFID device according to claim 1, wherein said at least one transmission line is a transmission line formed of two conductors, a first conductor which connects a terminal of said battery to said circuitry and a second conductor which connects a second terminal of said battery to said antenna and thereby to said circuitry.

21. The RFID device according to claim 20, wherein at least one of said at least one transmission lines is folded to form at least three sections and wherein said antenna is a dipole-type antenna.

22. An RFID device comprising:
(a) electronic circuitry suitable for an RFID device comprising a radio frequency section;
(b) an antenna;
(c) a battery which provides the device with power; and
(d) at least one quarter wavelength transmission line coupled between the battery and one or both of the electronic circuitry and the antenna,
wherein said transmission line is a shorted transmission line formed of a single conductor folded so two sections thereof are parallel and form a shorted transmission line two conductors, said single conductor connecting a terminal of said battery to said circuitry and also comprising a second conductor which connects a second terminal of said battery to said antenna and thereby to said circuitry.

23. The RFID device according to claim 22, wherein said second conductor is also formed into a shorted transmission line.

24. The RFID device according to claim 22, wherein the at least one transmission line is realized without adding components or assembly acts to said RFID device over a same device with same components and without said at least one transmission line.

25. The RFID device according to claim 22, wherein the RFID device consists essentially of said antenna, said battery, said circuitry and said at least one transmission line.

26. The RFID device of claim 22 wherein the battery has two terminals and wherein the at least one quarter wavelength transmission line is coupled between both terminals of the battery and one or both of the electronic circuitry and the antenna.

* * * * *